United States Patent [19]

Suzuki et al.

[11] 4,264,162

[45] Apr. 28, 1981

[54] DRIVE SYSTEM FOR ELECTROMAGNETICALLY DRIVEN SHUTTER

[75] Inventors: Ryoichi Suzuki; Yukio Ogawa, both of Kawasaki; Takao Kinoshita, Tokyo; Takashi Uchiyama, Yokohama, all of Japan

[73] Assignee: Canon Kabushiki Kaisha, Tokyo, Japan

[21] Appl. No.: 48,742

[22] Filed: Jun. 15, 1979

[30] Foreign Application Priority Data

Jun. 21, 1978 [JP] Japan .................................. 53-75137
Jun. 21, 1978 [JP] Japan .................................. 53-75138

[51] Int. Cl.$^3$ .......................... G03B 7/087; G03B 9/42
[52] U.S. Cl. ........................................ 354/50; 354/235
[58] Field of Search ................. 354/50, 51, 60 R, 234, 354/235

[56] References Cited

U.S. PATENT DOCUMENTS 4,012,751  3/1977  Espig ............................. 354/60 R X
4,072,965  2/1978  Kondo ............................. 354/234 X Primary Examiner—Michael L. Gellner
Attorney, Agent, or Firm—Toren, McGeady and Stanger

[57] ABSTRACT

In the drive system disclosed, a first power source supplies a driving current to drive a moving member of an electromagnetic shutter driving device in one direction or in the reverse direction a second power source device consisting of a DC booster circuit, a capacitor, etc.; a photo-to-electric converter circuit discerns the brightness level of an object to be photographed and controls the outputs of the first and second power source devices to shift between these two outputs. An automatic change-over supplies the output of the second power source to the electromagnetic shutter driving device when the level of the output of the photo-to-electric converter circuit is equal to or above a predetermined level and supplies the output of the first power source to the electromagnetic shutter driving device when the output level of the photo-to-electric converter circuit is lower than the predetermined level.

9 Claims, 8 Drawing Figures

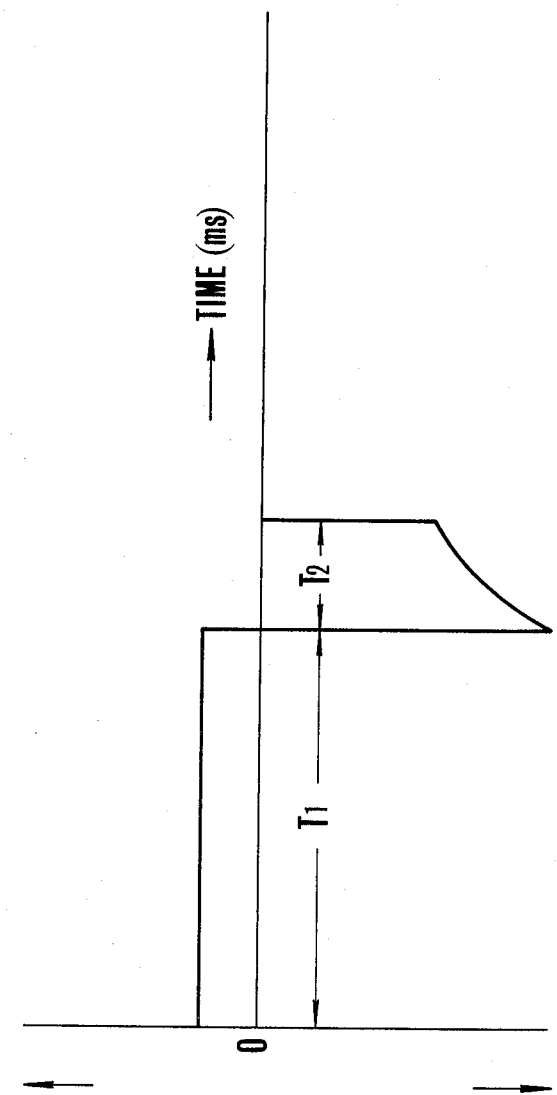

DRIVE SYSTEM FOR ELECTROMAGNETICALLY DRIVEN SHUTTER

BACKGROUND OF THE INVENTION

1. Field of the Invention

This invention relates to a drive system for an electromagnetically driven shutter which is electromagnetically opened and closed.

2. Description of the Prior Art

The driving force required for opening and closing the shutter of a camera generally has heretofore been derived from stored mechanical energy such as a spring force or the like irrespective as to whether the shutter is a lens shutter or a focal plane shutter. This has necessitated the use of a complex mechanism for driving a shutter with the stored mechanical energy. Accordingly, a complex mechanism has been also required for opening and closing the shutter. Such mechanisms have required the use of numerous component parts. In view of this, various kinds of electromagnetically driven shutters for producing a shutter driving force have recently been proposed. In these electromagnetically driven shutters, a driving force for opening and closing the shutter is electromagnetically generated by a drive mechanism. Therefore, the use of such a drive mechanism obviates the necessity of the type of mechanism required for a mechanical cocking action. Also, such an electromagnetically driven shutter permits replacement of all the mechanisms required for exposure control with electronic circuits. Thus, the electromagnetically driven shutter has many advantages over conventional mechanically driven shutters.

However, the structural arrangement of electromagnetically driven shutters has a number of drawbacks. For example, electromagnetically driven shutters in general use a moving coil type electromagnetic drive device having a permanent magnet and a moving coil. Between the pole piece and the yoke of the permanent magnet, is a bobbin on which a coil is wound. The bobbin is interlocked with the shutter. Therefore, when the coil is energized, an interaction between the current thus supplied and a magnetic flux generated by the permanent magnet between the yoke and the pole piece causes a force to be exerted on the bobbin in one direction to open the shutter. When the direction of the current supplied to the coil to energize it is reversed, the force is exerted on the bobbin in the reverse direction to close the shutter. For placing an electromagnetic drive device of this type within a camera, the size of the electromagnetic drive device is limited by a limited space available for accommodating it within the camera. Therefore, even where an alnico magnet is employed as permanent magnet, the magnetic flux generated in the gap between the yoke and the side face of the pole piece is 3000 to 5000 gauss. The electric current to be supplied to the coil is 0.5 to 1.0 A at the most, even with a single-3 alkaline battery used as battery. Further, in order to obtain stable current supply after the battery has been drained to some degree, the current becomes less than the aforementioned value.

Therefore, the driving force obtainable from an electromagnetic drive device is only several ten grams at the most. With such a driving force used for a shutter, it takes as much as 20 to 50 m sec. before the shutter is fully opened after the coil is energized. Then, for fully closing the shutter, a length of time 20 to 50 m sec. is also required. An example of the characteristic curves of such a shutter operation is illustrated by a curve a in FIG. 1 of the accompanying drawings. Furthermore, where an available space necessitates the use of a button type silver oxide or mercury cell as battery, the current available from such a battery is not more than several tens of m A. Therefore, in such a case, the length of time required for fully opening the shutter becomes still longer. To operate the shutter at a high speed of 1/500 or 1/1000 sec. with such an electromagnetic drive device, therefore, the shutter must be closed before it is fully opened. Then, the maximum aperture value becomes extremely small (less than f 32). A shutter characteristic curve of such a shutter operation is as represented by a curve b in FIG. 1. This tends to result in increasingly inconsistent of exposure values due to uneven cut of the aperture, etc. Also, diffraction might take place because of the extremely small aperture. Therefore, a shutter drive device of this type is not usable for a high speed shutter operation.

To solve this problem, U.S. Pat. No. 4,072,965 has disclosed a system for obtaining a driving force in which a capacitor is employed as current source for energizing the coil of an electromagnetic drive device; the capacitor is charged with a boosted voltage obtained by boosting the voltage of a battery; and the electric charge thus obtained is applied to the coil to obtain a driving force.

In this system, a driving current is obtained through a capacitor, so that a driving current which is several times as large as the driving current obtainable from a battery can be produced to permit a high speed shutter operation. However, in accordance with the system of this prior art, a large capacitance is required for accommodating the capacitor and this presents a problem with regard to an available space, etc. Assuming that a shutter is to be driven by the electric charge of the capacitor up to a low speed time of about 1/15 sec., for example, and assuming that the electric current I to be supplied to the coil is about 1 A, the quantity of electric charge Q of the capacity to required for flowing this current for a period of time $t_1$, 60 m sec. is:

$$Q = IT = 1 \times 60 \times 10^{-3} = 0.06 \text{ (coulomb)}$$

Then, assuming that the capacitor is charged with a voltage of 20 V, the capacitance C of the capacitor required for obtaining this much electric charge is:

$$C = \frac{Q}{V} = \frac{0.06}{20} = 3 \times 10^{-3} \quad (F)$$
$$= 3000 \quad (\mu F)$$

To have that high a capacitance, the capacitor must be of a size measuring about 20 to 30 mm in diameter and 30 to 60 mm in length. Then, such a large size makes it very difficult to place the capacitor within a limited space available in a camera.

The present invention is directed to the elimination of the above stated drawbacks of the prior art.

SUMMARY OF THE INVENTION

It is therefore an object of the present invention to provide a drive system for an electromagnetically driven shutter suitable for a camera in which the coil of an electromagnetic drive device is arranged to be energized by a capacitor for a high speed shutter operation and by a battery in the case of a low speed shutter operation.

It is another object of the present invention to provide a drive system for an electromagnetically driven shutter arranged to detect the voltage of the electric charge of a capacitor and to inhibit a shutter release operation when the electric charge voltage is below a predetermined value.

It is a further object of the invention to provide a drive system for an electromagnetically driven shutter arranged to increase the shutter closing speed by discharging the electric charge of a capacitor to close the shutter by a large driving force obtained thereby.

These and other objects, features and advantages of the invention will become more apparent from the following description of embodiments thereof when read in connection with the accompanying drawings.

BRIEF DESCRIPTION OF THE DRAWINGS:

FIG. 6(b) is a graph showing the characteristic of the shutter driving current of the electromagnetically driven shutter shown in FIGS. 2 and 5.

DESCRIPTION OF THE PREFERRED EMBODIMENTS

Figure 1:
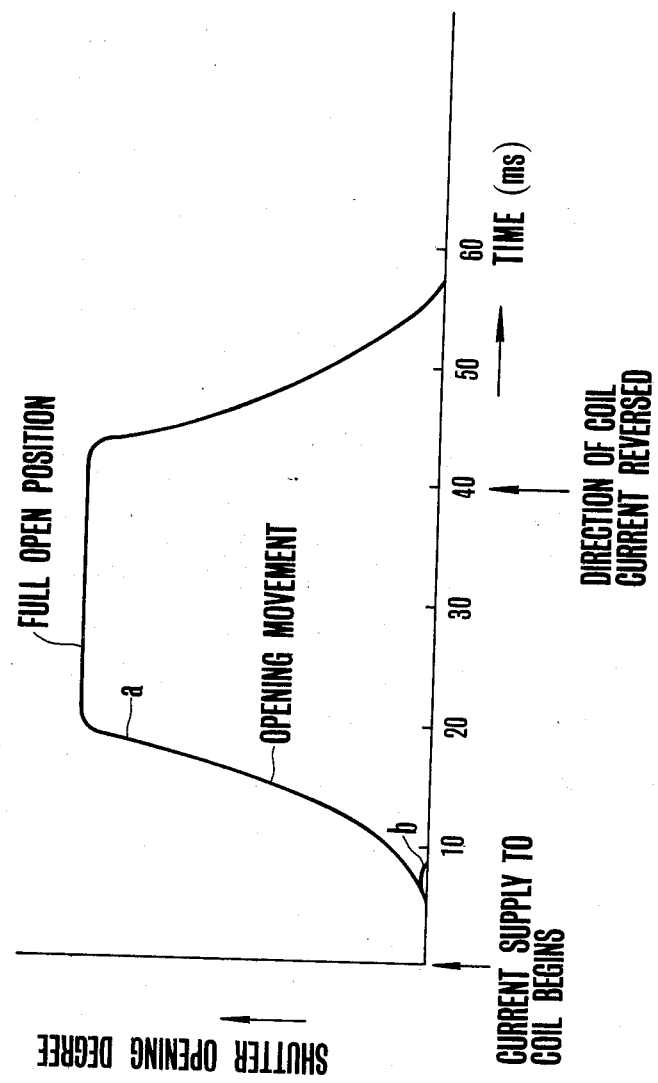
FIG. 1 is a graph showing the characteristic curves of conventional electromagnetically driven shutters.
Figure 2:
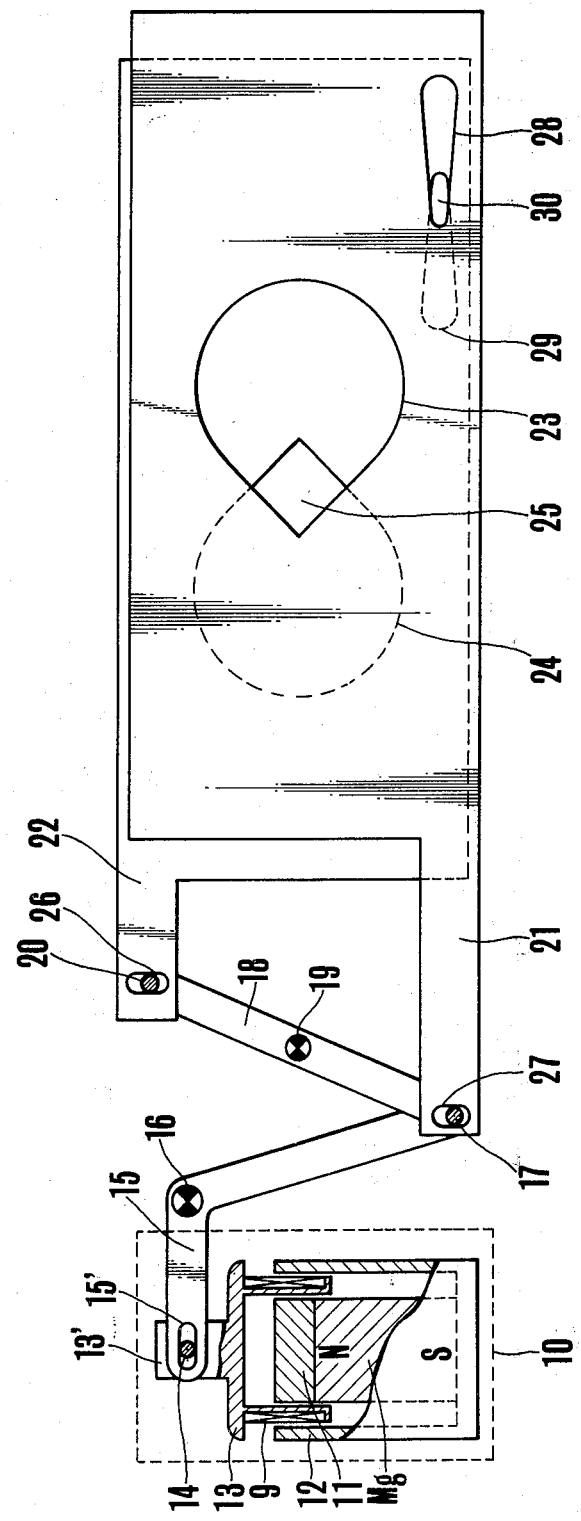
FIG. 2 is a schematic illustration of the structural arrangement of the electromagnetically driven shutter to which the present invention is applied.

In FIG. 2 which shows the structural arrangement of an electromagnetically driven shutter embodying the present invention, a moving coil type electromagnetic drive device 10 includes a coil bobbin 13 and a coil 9 movable up and down in a gap provided between a yoke 12 and a pole piece 11 of a permanent magnet Mg such as an alnico or rare earth magnet which is magnetized in the vertical direction. The coil 9 is wound on the coil bobbin 13 concentrically therewith. The bobbin 13 has a protrudent or protruding part 13'. A pin 14 is secured to the protruding part 13'. The protruding part 13' is connected by the pin 14 and a slot 15' to an L-shaped rotative (i.e., rotatable) lever 15 which is arranged to rotate on a center shaft 16. A pin 17 is secured to one end of the lever 15 to connect the L-shaped rotative lever 15 to one end of another rotative (i.e., rotatable) lever 18 which is arranged to be rotatable on its center shaft 19. A pin 20 is secured to the other end of the lever 18. A shutter is composed of two thin plates or blades 21 and 22. The shutter 21 and 22 is provided with shutter openings 23 and 24 and also with auxiliary diaphragm openings 28 and 29. The above stated pins 17 and 20 are disposed at the ends of the shutter blades 21 and 22.

The electromagnetically driven shutter arranged in this manner operates as follows: When the coil 9 is energized, the energizing current interacts with a magnetic flux generated by the permanent magnet Mg in the gap between the yoke 12 and the poles of the permanent magnet to exert a force on the bobbin to move it either upward or downward according to the direction in which the energizing current is applied to the coil 9. With the force thus exerted on the bobbin 13, the bobbin begins to move. The movement of the bobbin causes the L-shaped pin 14 to articulate the rotative lever 15 about the rotation center shaft 16. Assuming that the bobbin moves upward, the L-shaped lever 15 rotates clockwise. The clockwise rotation of the lever 15 causes the pin 17 to articulate the rotative lever 18 clockwise on the rotation center shaft 19. This rotation of the lever 18 causes the shutter blade 21 to slide leftward and the other shutter blade 22 to slide rightward. The openings 23 and 24 of the shutter blades 21 and 22 then form an overlapped opening 25 between them and the auxiliary diaphragm openings 28 and 29 also form an overlapped opening 30 as shown in FIG. 2. These overlapped openings are gradually enlarged as the shutter blades 21 and 22 move further. A surface of film which is not shown is thus exposed to a light coming through the overlapped opening part 25.

When the quantity of the light exposing the film reaches a predetermined value, the direction of the current applied to the coil 9 is reversed to exert a downward force on the bobbin 13. Then, the bobbin 13 begins to move downward. The downward movement of bobbin 13 causes the L-shaped rotative lever 15 and the rotative lever 18 to rotate counterclockwise and the shutter blades 21 and 22 begin to slide respectively in the directions opposite to the directions mentioned in the foregoing. The sliding movements of the shutter blades 21 and 22 in the reverse directions close the overlapped opening 25 between their openings 23 and 24 and the overlapped opening 30 between the auxiliary openings 28 and 29 and hence terminate the exposure of film to the light.

Figure 3:
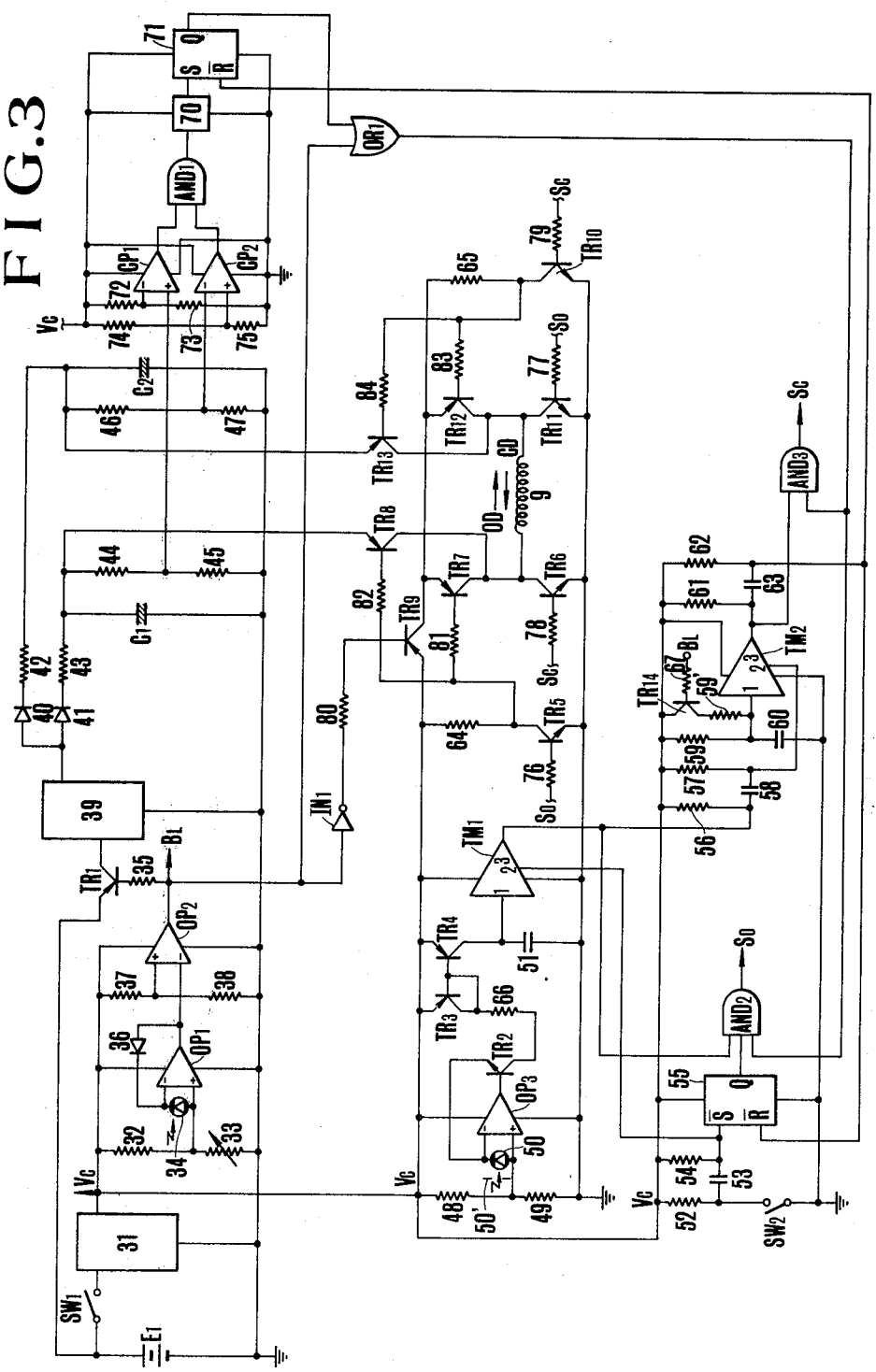
FIG. 3 is an electrical circuit diagram showing as an embodiment of the invention a drive control circuit of the electromagnetically driven shutter shown in FIG. 2.

In FIG. 3 which shows, as an example of embodiment of the invention, a drive control circuit of the electromagnetic driven shutter shown in FIG. 2, a reference symbol $E_1$ indicates a power source battery; and $SW_1$ indicates a main switch of the camera. A constant voltage circuit 31 is arranged to produce a constant voltage Vc. An operational amplifier $OP_1$ amplifies the output of a light sensitive element 34 such as a silicon photo cell (SPC). The latter is connected to the two input terminals of the operational amplifier $OP_1$ and is provided for discerning the brightness of an object to be photographed. The light sensitive element 34 is attached to the front face of the camera for the purpose of measuring outside light.

A diode 36 which is provided for logarithmic suppression is connected to the negative feedback route of the operational amplifier $OP_1$. A voltage dividing resistor 32 and a variable resistor 33 bias to give the non-inverting input terminal of the operational amplifier. Information on the ASA sensitivity of a film being used is supplied to the variable resistor 33. The output terminal of the operational amplifier $OP_1$ is connected to an inverting input terminal of an operational amplifier $OP_2$ which is provided for forming a comparison circuit.

Voltage dividing resistors 37 and 38 are arranged to give a voltage level to the non-inversion input terminal of the operational amplifier $OP_2$. A switching transistor $TR_1$ has its base connected to the output terminal of the operational amplifier $OR_2$ through a base resistor 35. When the output level of the operational amplifier $OP_1$ becomes higher than the potential at the voltage dividing point of the voltage dividing resistors 37 and 38, the output level of the operational amplifier $OP_2$ changes from a high level to a low level to turn on the transistor $TR_1$ thereby.

A reference numeral 39 indicates a DC booster provided for boosting its input voltage; 40 and 41 indicate diodes provided for preventing a charging current from flowing in the reverse direction; 42 and 43 indicate resistors arranged to limit the charging current; and symbols $C_1$ and $C_2$ indicate capacitors arranged to supply energizing currents to the coil 9 of the aforementioned electromagnetic drive device 10. The capacitor $C_1$ is arranged to supply a current required for opening the shutter and the capacitor $C_2$ a current required for closing the shutter.

Numerals 44 and 45 indicate voltage dividing resistors provided for detecting the charging voltage of the capacitor $C_1$ and numerals 46 and 47 voltage dividing resistors for detecting the charging voltage of the capacitor $C_2$. Each of these resistors has a high resistance value. Each of two comparators $CP_1$ and $CP_2$ detects the potential of the voltage dividing point of the resistors 44 and 45 or that of the resistors 46 and 47 and, when the detected potential becomes higher than a predetermined level established by voltage dividing resistors 72 and 73 or 74 and 75, the output level of the affected comparator changes from low to high. An AND gate $AND_1$ is arranged to obtain a logical product of the outputs of the comparators $CP_1$ and $CP_2$. A numeral 70 indicates a differentiation circuit; $OR_1$ indicates an OR gate which is arranged to obtain the logical sum of the output of a flip-flop circuit 71 and the output of the above stated operational amplifier $OP_2$; and $IN_1$ indicates an inversion circuit connected to the output terminal of the operational amplifier $OP_2$.

An operational amplifier $OP_3$ amplifies the output of a light sensitive element 50 such as a silicon photo-cell (SPC) connected between the two input terminals of the operational amplifier $OP_3$ for the purpose of measuring light. The light sensitive element 50 is located to measure incident light through the overlapped opening 30 between the auxiliary diaphragm openings 28 and 29 in the electromagnetic shutter blades. Resistors 48 and 49 bias the non-inverting input terminal of the operational amplifier $OP_3$. A variable density filter 50' is arranged in front of the light measuring light sensitive element 50 to enter the ASA sensitivity of the film being used. The variable density filter 50' is places an ND filter of a higher transmission factor in front of the light sensitive element 50 as the ASA sensitivity of the film increases.

A transistor $TR_2$ has a base terminal connected to the output terminal of the operational amplifier $OP_3$ while the collector terminal thereof is connected to the collector terminal of another transistor $TR_3$ through a resistor 66. The collector and the base of the transistor $TR_3$ are shortcircuited. The base terminal of the transistor $TR_3$ is connected to the base terminal of a transistor $TR_4$. The collector of the transistor $TR_4$ is connected to a time constant determining capacitor 51.

A timer operation circuit $TM_1$ is arranged to be set by a set signal applied to its terminal 2 and to be maintained at a high level for a given length of time determined by the charging time of the above stated time constant determining capacitor 51. The timer operation circuit $TM_1$ is, for example, is formed on a single chip integrated circuit such as the Analog IC 555 manufactured by RCA or the like. A differentiation circuit is formed by resistors 52 and 54 and a capacitor 53. The output pulse of the differentiation circuit is supplied to the set terminal 2 of the timer operation circuit $TM_1$ and the set terminal $\overline{S}$ of an RS flip-flop circuit 55. The logical product of the output of the timer operation circuit $TM_1$, the output of the RS flip-flop circuit 55 and that of the OR gate $OR_1$ is produced by an AND gate $AND_2$ which is arranged to receive three inputs. A shutter opening signal $S_o$ is produced from the output terminal of the AND gate $AND_2$. Numerals 56, 57 and 58 indicate resistors and a capacitor which constitute a differentiation circuit. A symbol $TM_2$ indicates another timer operation circuit which works in the same manner as the timer operation circuit $TM_1$ and is arranged to be set by the output pulse of the differentiation circuit formed by the resistors 56 and 57 and the capacitor 58.

The time constant of the timer operation circuit $TM_2$ is determined by resistors 59 and 59' and a capacitor 60. A switching transistor $TR_{14}$ is connected to the resistor 59'. The output BL of the operational amplifier $OP_2$ is applied to the base terminal of the switching transistor $TR_{14}$ through a resistor 67. Resistors 61 and 62 and a capacitor 63 form a differentiation circuit. The RS flip-flop circuit 71 is arranged to be reset by the output pulse of the differentiation circuit. An AND gate $AND_3$ produces a logical product of the outputs of the timer operation circuit $TM_2$ and the OR gate $OR_1$. A shutter closing signal $S_c$ is produced from the output terminal of the AND gate $AND_3$.

A group of switching transistors $TR_5$–$TR_{13}$ control the power supply to the coil 9 of the aforementioned electromagnetic drive device 10. These transistors $TR_5$–$TR_{13}$ are interconnected as illustrated in FIG. 3 and are arranged to perform the switching described below:

(1) When power is to be supplied to the coil 9 from the battery (for a low shutter speed):
 a. To open the shutter:
 Transistors $TR_9$, $TR_7$, $TR_{11}$ and $TR_5$ . . . on
 Other transistors . . . off
 b. To close the shutter:
 Transistors $TR_9$, $TR_{12}$, $TR_6$ and $TR_{10}$ . . . on
 Other transistors . . . off
(2) When power is to be supplied to the coil 9 from the capacitor (for a high shutter speed):
 a. To open the shutter:
 Transistors $TR_5$, $TR_8$ and $TR_{11}$ . . . on
 Other transistors . . . off
 b. To close the shutter:
 Transistors $TR_{10}$, $TR_{13}$ and $TR_6$ . . . on
 Other transistors . . . off In order to perform the above listed switching actions, the shutter opening signal $S_o$ is impressed on the bases of the switching transistors $TR_5$ and $TR_{11}$ through resistors 76 and 77 respectively; and the shutter closing signal $S_c$ is impressed on the bases of the transistors $TR_{10}$ and $TR_6$ through resistors 79 and 78 respectively. The output of the inversion circuit $IN_1$ is impressed on the base of the transistor $TR_9$ through a resistor 80. Numerals 81–84 indicate base resistors of the transistors $TR_8$, $TR_9$, $TR_{12}$ and $TR_{13}$. With the circuit arrangement described in the foregoing, a current flows to the coil 9 of the electromagnet drive device 10 in the direction of OD for opening the shutter and in the direction of CD for closing the shutter.

The circuit described in the foregoing operates as follows:

(1) When the brightness of an object to be photographed is high and the shutter must be operated at a high speed:

With the main switch $SW_1$ of the camera closed, a constant voltage Vc is produced in the output of the constant voltage circuit 31 to render the subsequent circuits operative. Since the brightness of the object is high, a large quantity of light falls on the light sensitive element 34. Accordingly, a large amount of photoelectric current proportional to the quantity of the incident light flows from the light sensitive element 34. The photoelectric current is then logarithmically suppressed by the logarithmic suppression diode 36 and a voltage corresponding to the logarithm of the brightness of the object is produced at the output terminal of the operational amplifier $OP_1$. The high brightness of the object to be photographed causes the output level of the operational amplifier to be higher than the voltage value of the voltage dividing point of the voltage dividing resistors 37 and 38. Therefore, the level of the output signal BL of the operational amplifier $OP_2$ which forms a comparison circuit becomes low to turn on the switching transistor $TR_1$. With the transistor $TR_1$ turned on, a current is supplied from the battery $E_1$ to the DC booster circuit 39 to produce a high DC voltage output at the booster circuit 39. Then, the capacitors $C_1$ and $C_2$ are charged with this high DC voltage through the diodes 41 and 40 and the resistors 43 and 42 respectively.

a. In cases where the shutter release operation is performed prior to completion of the charging process on the capacitors $C_1$ and $C_2$:

Before completion of the charging process on the capacitors $C_1$ and $C_2$, the voltage level of the voltage dividing point of the resistors 44 and 45 arranged to detect the charge voltage of the capacitor $C_1$ and that of the point of the voltage dividing resistors 46 and 47 arranged to detect the charge voltage of the capacitor $C_2$ are low. The output voltages of the comparator circuits $CP_1$ and $CP_2$ are therefore low so that the output of the AND gate $AND_1$ remains low. Hence, no differentiation pulse is produced by the differentiation circuit 70 and the output of the RS flip-flop circuit 71 also remains low. Further, since the output level of the operational amplifier $OP_2$ is low as mentioned in the foregoing, the output level of the OR gate $OR_1$ is also low.

In this condition, when a shutter release button is depressed, the normally open switch $SW_2$ is closed and a negative differentiation pulse is produced as output of the differentiation circuit formed by the resistors 52 and 54 and the capacitor 53. The RS flip-flop circuit 55 is set by the pulse and the level of the output voltage of the flip-flop circuit becomes high. Further, the negative differentiation pulse output of the differentiation circuit 52, 53 and 54 sets the timer operation circuit $TM_1$ to make the level of its output high. Thus, of the three inputs of the AND gate $AND_2$, the levels of two inputs become high. However, since the output of the OR gate $OR_1$ is at a low level, the output of the AND gate $AND_2$ remains low. Moreover, with the capacitors $C_1$ and $C_2$ not completely charged and with the output level of the OR gate $OR_1$ thus being low, the level of one of the two inputs of the AND gate $AND_3$ is low. The output level of the AND gate $AND_3$, therefore, remains low irrespective of the level of the other input.

Accordingly, the shutter opening signal So and the shutter closing signal Sc are kept at low levels. Then, since the switching transistors $TR_5$–$TR_{13}$ provided for controlling the current to be applied to the coil 9 remain off, the coil 9 is not energized.

In accordance with the arrangement of this embodiment, therefore, shutter opening and closing actions are not performed while the capacitors $C_1$ and $C_2$ have not been completely charged, even if a shutter releasing operation is performed, because: if the coil 9 is allowed to be energized before completion of the charging process on the capacitors $C_1$ and $C_2$, a sufficient driving force for a high shutter speed can not be obtained and then correct exposure might not be effected.

b. Operation where a shutter release occurs after completion of the charging process on the capacitors $C_1$ and $C_2$:

Upon completion of the charging process on the capacitors $C_1$ and $C_2$, the potential level of the voltage dividing point of the voltage dividing resistors 44 and 45, which are provided for detecting the charge voltage of the capacitor $C_1$, and that of the dividing point of the voltage dividing resistors 46 and 47, which are provided for detecting the charge voltage of the capacitor $C_2$, become high. Therefore, the output voltage levels of the comparator circuit $CP_1$ and $CP_2$ become high and the level of the output of the AND gate $AND_1$ also becomes high, and positive differential pulses are generated from the differentiation circuit 70. These pulses set the RS flip-flop circuit 71 and its output is inverted to a high level. This in turn causes the output level of the OR gate $OR_1$ to go high. When a shutter release operation is performed under this condition, the RS flip-flop circuit 55 is set through the process described in the foregoing and the output level of the flip-flop circuit 55 becomes high. At the same time the timer operation circuit $TM_1$ is set to make the level of its output high. With the timer operation circuit $TM_1$ set, the time constant determining capacitor 51 begins to be charged.

Since the levels of the three inputs to the AND gate $AND_2$ are high under this condition, the output level of the AND gate $AND_2$ also becomes high to make the level of the shutter opening signal So high. Therefore, the switching transistors $TR_5$ and $TR_{11}$ are turned on. Also, because the level of the brightness discerning signal BL is low at this time, the level of the output of the inversion circuit $IN_1$ L is high and the switching transistor $TR_9$ is off. Therefore, when the switching transistor $TR_5$ turns on, the switching transistor $TR_8$ is also turned on. Then, a current flows from the capacitor $C_1$ through the switching transistors $TR_8$ and $TR_{11}$ to the coil 9 in the direction of OD to cause the shutter to open.

When the aforementioned shutter release operation causes the differentiation circuit 52, 53 and 54 to produce a negative differentiation pulse, the timer operation circuit $TM_1$ is set by the pulse and the time constant determining capacitor 51 begins to be charged. When the shutter begins to open as mentioned in the foregoing, the auxiliary diaphragm disposed in front of the light measuring light sensitive element 50 also begins to open and a light from the object to be photographed strikes the light sensitive element 50. A photoelectric current proportional to this incident light then begins to flow from the light sensitive element 50. The photoelectric current then becomes an emitter current of the transistor $TR_2$ connected to the output terminal of the operational amplifier $OP_3$. A collector current which is about equal to the emitter current flows to the transistor $TR_2$. Then, the collector and the base of the transistor $TR_3$ is shortcircuited and the transistor $TR_3$ serves as diode that produces a voltage corresponding to a voltage between the base and the emitter of the transistor $TR_4$. Therefore, this causes a collector current equal to the collector current of the transistor $TR_2$ to flow through the collector of the transistor $TR_4$. The time constant determining capacitor 51 is thus charged with a current equal to the photoelectric current of the light measuring light sensitive element 50. When the voltage of this electric charge exceeds the threshold value of the timer operation circuit $TM_1$, the level of the output of the timer operation circuit $TM_1$ becomes low. This causes the level of the output (the shutter opening signal So) of the AND gate $AND_2$ to become low.

Figure 4:
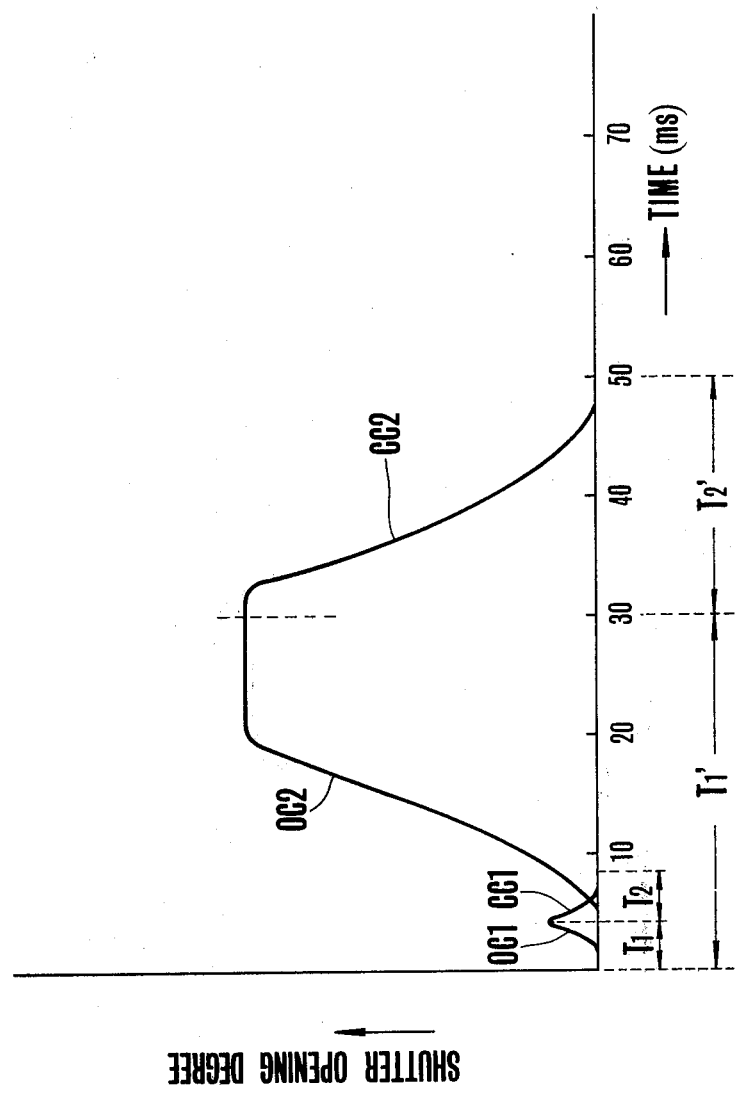
FIG. 4 is a graph showing the characteristic curves of the electromagnetically driven shutter shown in FIGS. 2 and 3.

In this manner, the shutter opening signal So remains at a high level for a length of time determined by the timer operation circuit $TM_1$, i.e. during the length of time $T_1$ shown in FIG. 4. During this period, the coil 9 of the electromagnetic drive device 10 is supplied with a current in the direction of OD and the shutter proceeds to open in a manner as represented by a curve $OC_1$ in FIG. 4.

When the output of the timer operation circuit $TM_1$ changes from a high level to a low level to cut off the current supply to the coil 9 of the electromagnetic drive device 10 in the direction of OD, the differentiation circuit 56, 57 and 58 produces a negative differentiation pulse to set the timer operation circuit $TM_2$. Then, the time constant determining capacitor 60 begins to charge. Concurrently with this, the output of the timer operation circuit $TM_2$ changes to a high level. Then, since the output level of the OR gate $OR_1$ is high, the output of the AND gate $AND_3$ also changes to a high level. This causes the level of the shutter closing signal Sc to become high and the switching transistors $TR_6$ and $TR_{10}$ are turned on. Since the switching transistor $TR_9$ remains in an off state when an object to be photographed is in a highly bright state as mentioned in the foregoing, the switching transistor $TR_{13}$ turns on with the switching transistor $TR_{10}$ turned on. Therefore, the capacitor $C_2$ supplies through the switching transistors $TR_{13}$ and $TR_6$, the coil 9 of the electromagnetic drive device 10 with a current in the direction of CD which is reverse to the direction in which the current is supplied for opening the shutter. With the coil 9 supplied with the current, the shutter beings to close. Meanwhile, since the object to be photographed is very bright, the level of the brightness discerning signal BL is low and, accordingly, the switching transistor $TR_{14}$ is in an on state, the capacitor 60 is charged in accordance with a time constant determined by the parallel resistance values of the resistors 59 and 59' and the capacity value of the capacitor 60. When the voltage of the electric charge of the capacitor 60 exceeds the threshold value of the timer operation circuit $TM_2$, the output of the timer operation circuit $TM_2$ changes to a low level. This causes the output of the AND gate $AND_3$ to change to a low level. The switching transistors $TR_6$ and $TR_{10}$ are turned off and then the switching transistor $TR_{13}$ is also turned off to cut off the current supply to the coil 9 of the electromagnetic drive device 10. In other words, the coil 9 of the electromagnetic drive device 10 is supplied with the current in the direction of CD for a length of time $T_2$ determined by the timer operation circuit $TM_2$ as indicated in FIG. 4. Then, the shutter closes in a manner as represented by a curve $CC_1$ in FIG. 4.

With the output of the timer operation circuit $TM_2$ changed to a low level, the output terminal of the differentiating circuit 61, 62 and 63 produces a negative differentiation pulse, which resets the RS flip-flop circuits 55 and 71 to make the outputs of these flip-flop circuits low. The sequence of actions required for an exposure operation of the camera are completed through the steps described in the foregoing.

(2) Operation when the brightness of an object to be photographed is low and the shutter must run at a low speed:

Since the brightness of the object is low, the quantity of light striking the light sensitive element 34, provided for measuring an outside light is small. Therefore, the output level of the operational amplifier $OP_1$ does not increase beyond the potential of the voltage dividing point of the voltage dividing resistors 37 and 38. The output signal BL of the operational amplifier $OP_2$ which forms a comparison circuit is now high and the switching transistor $TR_1$ remains off. Accordingly, the booster circuit 39 does not work and the capacitors $C_1$ and $C_2$ are not charged. Further, the level of the output of the inversion circuit, i.e., inverter, $IN_1$ is low.

When a shutter release operation is performed under these circumstances, the normally open switch $SW_2$ closes and, as described in the foregoing, the RS flip-flop circuit 55 and the timer operation circuit $TM_1$ are set so their respective outputs change to high levels.

Further, since the output of the operational amplifier $OP_2$ is high and the output of the OR gate $OR_1$ is also high, all of the three inputs to the AND gate $AND_2$ are high. Therefore, the output level of the AND gate $AND_2$ becomes high and raises the shutter opening signal So to a high level. This causes the switching transistors $TR_5$ and $TR_{11}$ to turn on. Meanwhile, since the inversion circuit $IN_1$ has its output at a low level, the switching transistor $TR_9$ is turned on. The on switching transistor $TR_5$ turns on the switching transistor $TR_7$. Since the capacitors $C_1$ and $C_2$ have not been charged, the switching transistor $TR_8$ does not turn on. Through these processes, a current flows from the constant voltage circuit 31 to the coil 9 of the electromagnetic drive device 10 through the switching transistors $TR_9$, $TR_7$ and $TR_{11}$ in the direction OD to open the shutter. Then, since the current flowing to the coil 9 is supplied at a low voltage of the constant voltage circuit 31, the current is much smaller than when a current is supplied from the capacitor $C_1$. Therefore, compared with the shutter driving operation performed by the electric charge of the capacitor $C_1$, the shutter in this case is opened at a much slower speed to have a shutter opening characteristic as represented by a curve $OC_2$ in FIG. 4.

Concurrently with setting of the timer operation circuit $TM_1$, the time constant determining capacitor 51 begins charging. However, since the current with which the time constant determining capacitor 51 is to be charged is determined by the quantity of the light incident upon the photometric light sensitive element 50 as mentioned in the foregoing, the capacitor 51 is charged with a small current when the brightness of the object to be photographed is low. Therefore, a long period of time is required for charging the time constant determining capacitor 51. In this case, therefore, the output level of the timer operation circuit $TM_1$ remains high for a longer period of time and the shutter opening current flows for a length of time $T_1'$ as shown in FIG. 4. Next, when the output of the timer operation circuit $TM_1$ changes to a low level, the timer operation circuit $TM_2$ is set as mentioned in the foregoing and the output level of the circuit $TM_2$ remains high for a period of time determined by the length of time required for charging the time constant determining capacitor 60.

The high level of the brightness discerning signal BL turns off the switching transistor $TR_{14}$. Therefore, the time constant determining capacitor 60 is charged only through the resistor 59. This makes the time constant determined by the capacitor 60 longer than a bright object. Therefore, a shutter closing current flows for a length of time $T_2'$ as shown in FIG. 4 along a shutter closing characteristic $CC_2$ in FIG. 4. As described in the foregoing, in cases where the brightness of an object to be photographed is low, the constant voltage circuit 31 supplies a current to the coil 9 of the electromagnetic drive device 10 over a long period of time $T_1'+T_2'$ as shown in FIG. 4 to drive the shutter at a slow speed.

As described in detail in the foregoing, in this embodiment, the brightness of the object is discerned and a large current is supplied from a capacitor to the coil 9 of the electromagnetic drive device 10 only when the shutter must be operated at a high speed. When a high speed shutter operation is not required, a current is supplied from a battery to the coil 9. The coil 9 of the electromagnetic drive device 10 is thus arranged to obtain a current from a capacitor only for driving the shutter at a high speed. This arrangement, therefore, does not require a large quantity of electric charge and serves to permit the use of a capacitance of a small capacity. Therefore, a capacitor of a small size can be used and can be easily placed within a limited space available in a camera. Besides, in accordance with the arrangement, the length of time required for charging the capacitor also can be shortened.

In accordance with the invention, therefore, it is possible to obtain an electromagnetically driven shutter that can be operated at a high speed and also can be easily placed within a camera. Compared with the conventional mechanical shutter, the electromagnetically driven shutter obtained in accordance with the present invention is simple in structure and can be formed with a less number of parts. These are salient advantages in terms of practical applications and manufacture.

Figure 5:
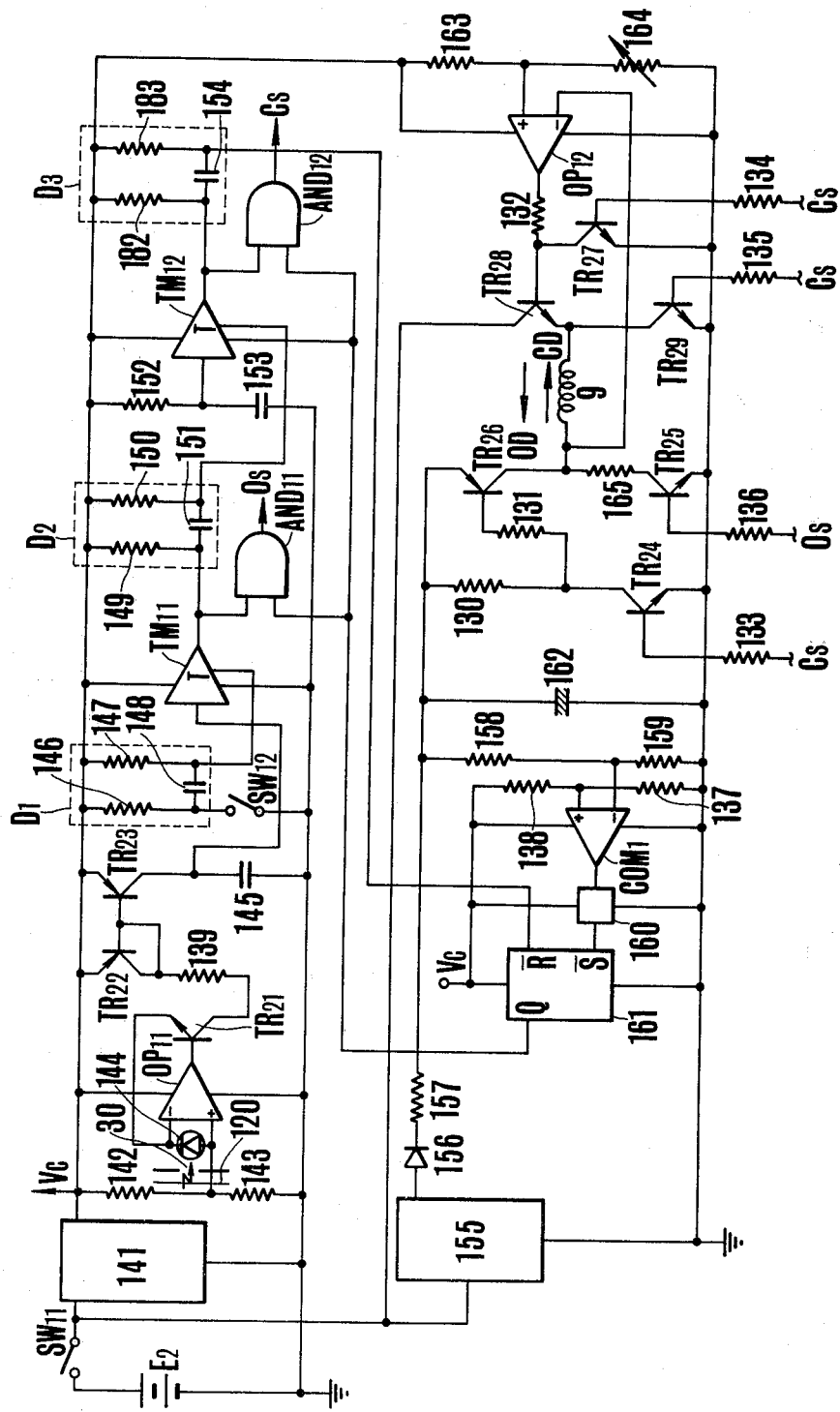
FIG. 5 is an electric circuit diagram showing, as another embodiment of the invention, a drive control circuit of the electromagnetically driven shutter shown in FIG. 2.

FIG. 5 illustrates another embodiment example of the drive control circuit of the electromagnetically driven shutter of the invention shown in FIG. 2. In FIG. 5, a reference symbol $E_2$ indicates a power source battery; $SW_{11}$ indicates a power source switch; a reference numeral 141 indicates a constant voltage circuit; $OP_{11}$ indicates an operational amplifier which forms a SPC head amplifier; and 144 indicates a light sensitive element such as a silicon photo cell (SPC). The light sensitive element 144 is connected between the two input terminals of the operational amplifier $OP_{11}$. Voltage dividing resistors 142 and 143 are arranged to give a voltage level to a non-inversion input terminal of the operational amplifier $OP_{11}$. A transistor $TR_{21}$ has its base connected to the output terminal of the operational amplifier $OP_{11}$. A symbol $TR_{22}$ indicates a transistor which is arranged to serve as diode with the base and the collector thereof shortcircuited. The collector of the transistor $TR_{22}$ is connected to the collector of the transistor $TR_{21}$ through a resistor 139. The base of the transistor $TR_{22}$ is connected to the base of a transistor $TR_{23}$. A time constant determining capacitor 145 is connected to the collector of the transistor $TR_{23}$.

A differentiation circuit $D_1$ is formed by resistors and a capacitor 146, 147 and 148. A symbol $SW_{12}$ indicates a normally open switch which closes in response to a shutter release operation; and $TM_{11}$ indicates a timer operation circuit. The timer operation circuit $TM_{11}$ is formed into an analog IC chip and is arranged in the following manner: When the terminal T of the circuit receives a trigger pulse, the output level of the circuit becomes high and, concurrently with this, the circuit begins to charge the capacitor 145. When the voltage of the electric charge of the capacitor 145 reaches a predetermined level, the output level of the circuit $TM_{11}$ becomes low. Therefore, the output of the timer operation circuit $TM_{11}$ is kept at a high level just for a length of time determined by the time constant circuit.

Another differentiation circuit $D_2$ is formed by resistors and a capacitor 149, 150 and 151. There is provided another timer operation circuit $TM_{12}$ which operates in the same manner as the other timer operation circuit $TM_{11}$. The time constant of the timer operation circuit $TM_{12}$ is determined by a resistor and a capacitor 152 and 153. The timer operation circuit $TM_{12}$ is arranged to be triggered by the output of the above stated differentiation circuit $D_2$.

A differentiation circuit $D_3$ is formed by resistors and a capacitor 182, 183 and 154. A numeral 155 indicates a DC booster; 156 indicates a diode which is arranged to prevent the electric charge of the capacitor from flowing in the reverse direction; 157 indicates a resistor arranged to restrain a current with which the capacitor is charged; 162 indicates a capacitor which is arranged to supply a shutter closing current; and 158 and 159 indicate voltage dividing resistors which are provided for detecting the voltage of the electric charge of the capacitor 162.

Figure 6A:
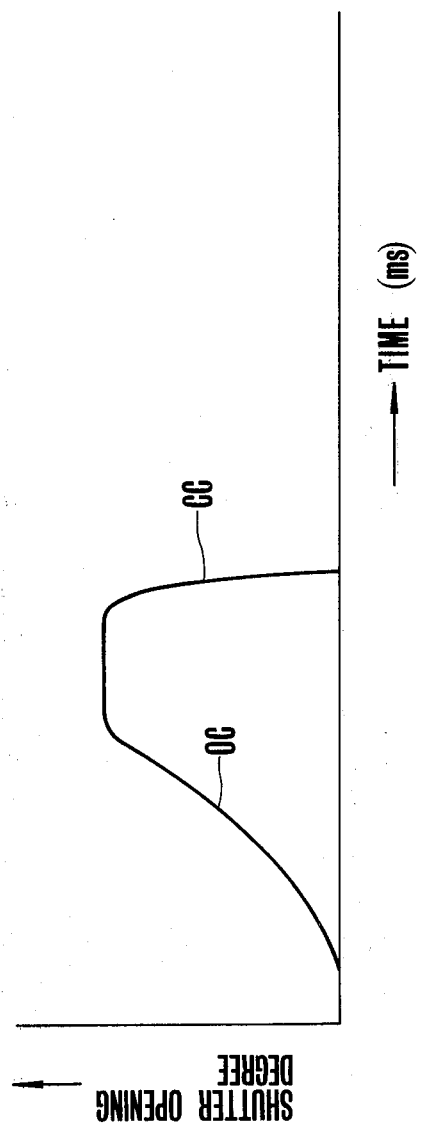
FIG. 6(a) is a graph showing a characteristic curve of the electromagnetically driven shutter shown in FIGS. 2 and 5.

When the potential of the voltage dividing point of the above stated voltage dividing resistors 158 and 159 reaches a given level determined by voltage division by resistors 138 and 137, the output of a comparison circuit $COM_1$ changes to a low level. A numeral 160 indicates a differentiation circuit; 161 indicates a RS flip-flop circuit which is arranged to be set by the output of the differentiation circuit 160. An AND gate $AND_{11}$ is arranged to obtain a logical product of the output Q of the flip-flop circuit 161 and the output of the timer operation circuit $TM_{11}$. There is provided another AND gate $AND_{12}$ which obtains a logical product of the output Q of the flip-flop circuit 161 and the output of the timer operation circuit $TM_{12}$. A shutter opening signal OS is obtained from the output terminal of the AND gate $AND_{11}$ and a shutter closing signal CS from that of the AND gate $AND_{12}$. These signals are arranged to be supplied to a drive circuit of an electromagnetic driving coil which is described hereinafter. There are provided a groups of switching transistors $TR_{24}$–$TR_{29}$ which are arranged to control current supply to the coil 9 of the electromagnetic drive device 10. The base of the transistor $TR_{25}$ is connected to the output terminal of the AND gate $AND_{11}$ through a resistor 136 while the bases of the transistors $TR_{24}$, $TR_{27}$ and $TR_{29}$ are connected to the output terminal of the AND gate $AND_{12}$ through resistors 133, 134 and 135. An operational amplifier $OP_{12}$ forms a constant current circuit. A numeral 165 indicates a resistor provided for detecting the value of a shutter opening current; 163 and 164 indicate a voltage dividing resistor and a voltage dividing variable resistor which are arranged to give a level to the non-inversion input terminal of the operational amplifier $OP_{12}$. The value of the shutter opening current of the coil 9 of the electromagnetic drive device 10 are adjustable by adjusting the variable resistor 164. The inversion input terminal of the operational amplifier $OP_{12}$ is connected to the collector of the transistor $TR_{26}$ while the output of the operational amplifier $OP_{12}$ is arranged to be applied to the base of the transistor $TR_{28}$ through a resistor 132. Numerals 130 and 131 indicate resistors. In this embodiment example, information on the ASA sensitivity of a film to be used is arranged to be obtained by changing the transmission factor of a variable density filter 120 which is disposed in front of the photometric light sensitive element 144. The operation of the circuit arrangement which is described in the foregoing will be understood from the following description with reference to the operation characteristic curves shown in FIG. 6(a) and (b):

When the main switch $SW_{11}$ of the camera is closed, the DC booster 155 is actuated to have the capacitor 162 charged by the output voltage of the booster 155 through the diode 156 and the resistor 157. When the voltage of the electric charge of the capacitor 162 comes to exceed a predetermined level, the output of the comparison circuit $COM_1$ changes to a low level and a differentiation pulse is produced at the output terminal of the differentiation circuit 160 to set the RS flip-flop circuit 161. The output Q of the flip-flop circuit 161 then changes to a high level. When a shutter release operation is performed under this condition, the switch $SW_{12}$ is closed and a negative differentiation pulse if produced at the output terminal of the differentiation circuit $D_1$ to trigger therewith the timer operation circuit $TM_{11}$. The output level of the timer operation circuit $TM_{11}$ becomes high and, concurrently with this, the time constant determining capacitor 145 begins to be charged. Since the output level of the RS flip-flop circuit 161 has become high with the output of the timer operation circuit $TM_{11}$ changed to a high level, the output level of the AND gate $AND_{11}$ also become high to produce the shutter opening signal OS. The switching transistor $TR_{25}$ is turned on by this signal. Since the level of the shutter closing signal CS has become low at this time, the switching transistors $TR_{24}$, $TR_{26}$, $TR_{27}$ and $TR_{29}$ have turned off and the transistor $TR_{28}$ has turned on. Therefore, the coil 9 of the electromagnetic drive device 10 is suppllied with a current from the battery $E_2$ in the direction of OD through the switching transistors $TR_{28}$ and $TR_{25}$ and the shutter begins to open as mentioned in the foregoing. Then, since the voltage of the current detecting resistor 165 has been fed back to the invention input terminal of the operational amplifier $OP_{12}$ at this time, the current supply to the coil 9 is kept constant. When the auxiliary diaphragm opening 30 is formed as the shutter opening movement further proceeds, a light comes to fall on the photometric light sensitive element 144 from the opening 30. Then, a current proportional to the quantity of this incident light flows to the collector of the transistor $TR_{21}$. The transistor $TR_{22}$ then acts to cause a current equal to this collector current to flow to the collector of the transistor $TR_{23}$ to charge the time constant determining capacitor 145 with this current. When the voltage of the electric charge of the capacitor 145 reaches a given level, the output level of the timer operation circuit $TM_{11}$ turns low. Then, the output OS of the AND gate $AND_{11}$ changes to a low level to turn off the switching transistor $TR_{25}$ and thereby the current supply to the coil 9 in the direction of OD is cut off. Thus, as shown in FIG. 6(b), a current in the shutter opening direction is allowed to flow to the coil 9 for a length of time $T_1$ which is proportional to the brightness of the object to be photographed. When the output of the timer operation circuit $TM_{11}$ turns to a low level, a negative differentiation pulse is produced by the differentiation circuit $D_2$ concurrently with this. The pulse causes the output of the timer operation circuit $TM_{12}$ to change to a high level and, at the same time, the time constant determining capacitor 153 begins to be charged. Further, with the output of the timer operation circuit $TM_{12}$ changed to a high level, the output level of the AND gate $AND_{12}$ becomes high to produce the shutter closing signal CS. This signal causes the switching transistors $TR_{24}$, $TR_{27}$ and $TR_{29}$ to turn on. With the switching transistor $TR_{27}$ thus turned on, the transistor $TR_{28}$ turns off. Further, with the switching transistor $TR_{24}$ thus turned off, the switching transistor $TR_{26}$ comes to turn on. Therefore, through these switching transistors $TR_{26}$ and $TR_{29}$, the capacitor 162 supplies the coil 9 with a current in the direction of CD and the shutter begins to close. Since the current in the shutter closing direction is supplied from the capacitor which has been charged by the booster circuit, the value of the current is greater than the current which is used for opening the shutter. Therefore, the shutter is quickly closed in a manner as represented by a curve CC shown in FIG. 6(a).

When the voltage of the electric charge of the time constant determining capacitor 153 reaches a given level, the output of the timer operation circuit $TM_{12}$ changes to a low level. This in turn causes the output of the AND gate $AND_{12}$ to change also to a low level. All of the switching transistors $TR_{24}$, $TR_{26}$, $TR_{27}$ and $TR_{29}$ are then turned off to cut off the current supply to the coil 9. Further, with the output of the timer operation circuit $TM_{12}$ having turned to the low level, a negative differentiation pulse is produced at the output terminal of the differentiation circuit $D_3$. The RS flip-flop circuit 161 is then reset by the pulse and the output Q of the flip-flop circuit changes to a low level.

The shutter closing current thus flows to the coil 9 for a length of time $T_2$ as shown in FIG. 6(a). Since this closing current is supplied from the capacitor 162 which has been charged with a boosted voltage, the value of the current is much greater than the value of the current supplied for opening the shutter. Accordingly, the shutter closing characteristic becomes steep as represented by a curve CC in FIG. 6(a). This steepness makes the characteristic less inconstant to give a stable shutter operating characteristic.

Since the RS flip-flop circuit 161 is not set and the output Q of the circuit remains at a low level before completion of a charging process on the capacitor 162, the outputs of the AND gates $AND_{11}$ and $AND_{12}$ are also kept at their low levels before the charging process is completed. Before completion of the charging process on the capacitor 162, therefore, no current supply is effected to the coil 9 and the shutter can not be operated even if a shutter release operation is performed under such a condition.

Figure 7:
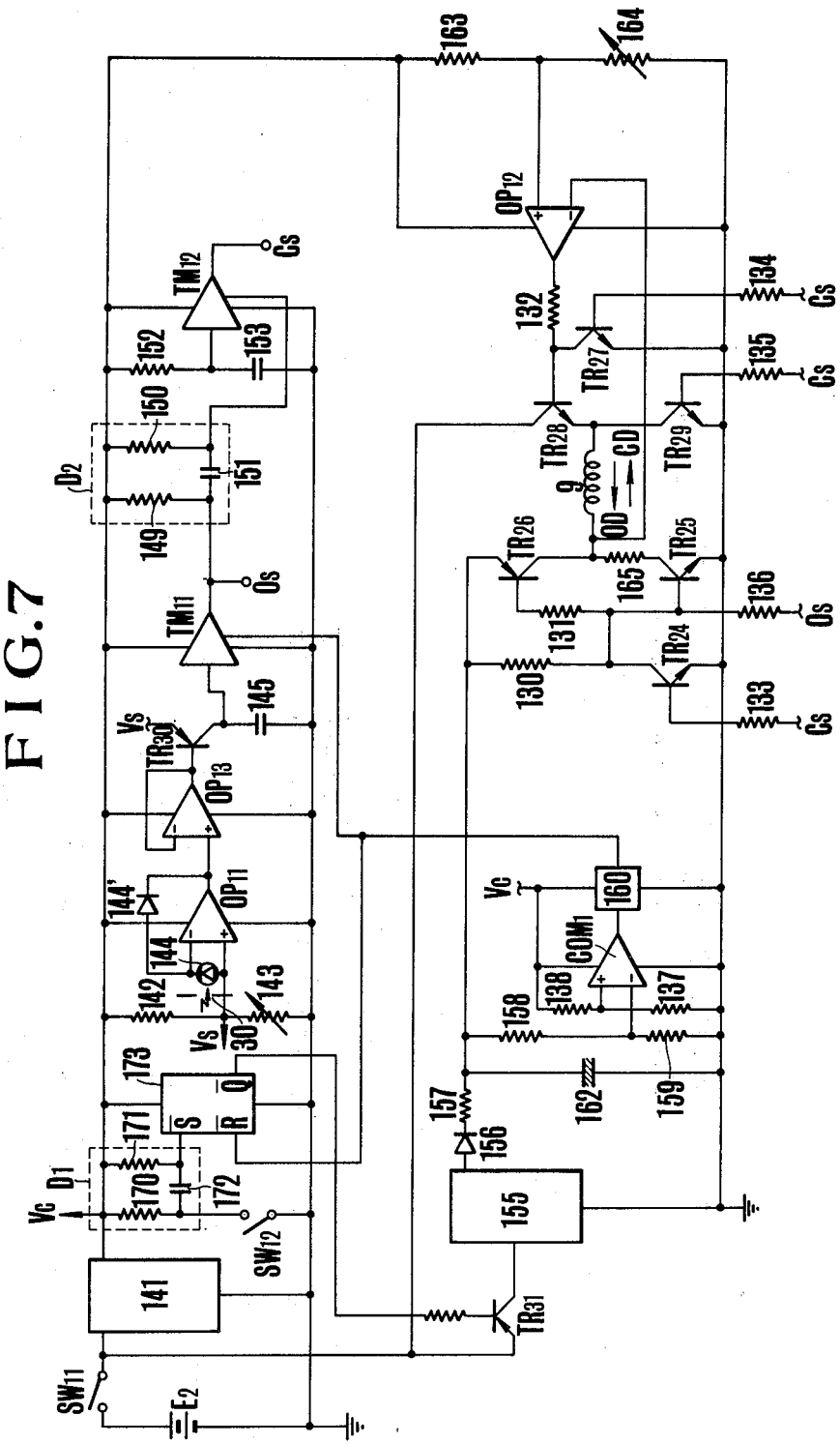
FIG. 7 is an electric circuit diagram showing, as a further embodiment of the invention, a drive control circuit of the electromagnetically driven shutter shown in FIG. 2.

FIG. 7 is a circuit diagram showing a further embodiment example of the invention. The embodiment shown in FIG. 7 differs from the embodiment shown in FIG. 5 in the following point: A charging process on a capacitor for closing the shutter is initiated by a shutter release operation and is automatically stopped when the voltage of the electric charge of the capacitor reaches a predetermined level. Then, concurrently with the completion of the charging process, a shutter releasing action begins. In FIG. 7, the same parts are indicated by the same reference symbols or numerals as in FIG. 5 while the embodiment shown in FIG. 7 also operates in a manner similar to the embodiment shown in FIG. 5. Therefore, the following description covers only the component parts and their actions that differ from those of the embodiment shown in FIG. 5 while the rest are omitted.

Referring to FIG. 7, a normally open switch $SW_{12}$ is arranged to close in response to a shutter release operation. A differentiation circuit $D_3$ is formed by resistors 170 and 171 and a capacitor 172. A numeral 173 indicates a RS flip-flop circuit. A switching transistor $TR_{31}$ controls a current supplied from a battery $E_2$ to a DC booster 155. An operational amplifier $OP_{11}$ forms a SPC head amplifier. A light sensitive element 144 is connected to the two input terminals of the operational amplifier $OP_{11}$ while a diode 144° for logarithmic suppression is connected to a negative feedback route thereof. A resistor 142 and a variable resistor 143 are arranged to give a potential to the non-inversion input terminal of the operational amplifier $OP_{11}$. The variable resistor 143 is also arranged to be supplied with information on the ASA sensitivity of a film to be used. A voltage follower is formed by an operational amplifier $OP_{13}$ the output terminal of which is connected to the base of a transistor $TR_{30}$ provided for logarithmic expansion. The voltage VS of the voltage dividing point of the resistor 142 and the variable resistor 143 is arranged to be supplied to the emitter of the transistor $TR_{30}$. A time constant determining capacitor 145 is connected to the collector of the transistor $TR_{30}$. The operation of this circuit arrangement is as described below:

When a shutter release operation is performed by closing the main switch $SW_{11}$ of the camera, the switch $SW_{12}$ is closed and a negative differentiation pulse is produced by the differentiation circuit $D_1$. The RS flip-flop circuit 173 is set by the pulse and the output $\overline{Q}$ of the flip-flop circuit 173 changes to a low level. This causes the switching transistor $TR_{31}$ to turn on to effect power supply to the DC booster 155 which in turn produces a boosted DC voltage. Then, the capacitor 162 is charged with this boosted voltage through the diode 156 and the resistor 157. When the voltage of this electric charge reaches a predetermined level, the output of the comparison circuit $COM_1$ changes to a low level and the differentiation circuit 160 produces a negative differentiation pulse to reset thereby the RS flip-flop circuit. The output $\overline{Q}$ of the flip-flop circuit then changes to a high level. This causes the switching transistor $TR_{31}$ to turn off. The DC booster 155 ceases to work and a charging process on the capacitor 162 comes to a stop.

Further, the negative differentiation pulse produced by the differentiation circuit 160 also triggers the timer operation circuit $TM_{11}$ to make the output level of the circuit $TM_{11}$ high. A shutter opening signal OS is produced by this. Then, concurrently with this, the time constant determining capacitor 145 begins to be charged. The shutter opening signal OS causes a driving current to flow to the coil 9 in the direction of OD and shutter opening movement begins. When this movement causes a light to fall on the light sensitive element 144 from the auxiliary diaphragm opening 30, the light sensitive element 144 produces a current proportional to the incident light. This current is then logarithmically suppressed by the logarithmic suppression diode 144' and the output level of the operational amplifier $OP_{11}$ changes in accordance with the logarithmic value of the quantity of the incident light. The output of the operational amplifier $OP_{11}$ then also appears in the output of the operational amplifier which forms a voltage follower. The output voltage of the amplifier $OP_{13}$ is then logarithmically expanded by the transistor $TR_{30}$. The time constant determining capacitor 145 is charged with the logarithmically expanded current thus obtained. When the voltage of the electric charge of the capacitor 145 reaches a predetermined level, the output level of the timer operation circuit $TM_{11}$ becomes low to cause a negative differentiation pulse to be produced from the output terminal of the differentiation circuit $D_2$. The pulse then triggers the timer operation circuit $TM_{12}$ to make the output level of the circuit $TM_{12}$ high and a shutter closing signal CS is produced. When the shutter closing signal CS is thus produced, concurrently with this, the time constant determining capacitor 153 begins to be charged. When the voltage of the electric charge of the capacitor 153 reaches a predetermined level, the output level of the timer operation circuit $TM_{12}$ becomes low.

The switching transistors $TR_{24}$-$TR_{29}$ act in the same manner as in the case of FIG. 5 while the shutter opening signal OS and the shutter closing signal CS are produced. Their actions during these periods are therefore omitted from description here.

As will be understood from the foregoing detailed description, in this embodiment, the driving current required for closing the shutter is supplied from the capacitor which has been charged with a boosted voltage. Therefore, compared with arrangement to supply a current from a battery, a much greater driving current is obtainable by the arrangement of the embodiment. The shutter closing characteristic thus becomes steep to prevent inconstancy of the characteristic of the shutter due to a frictional force, etc. so that exposure can be effected at a high degree of accuracy.

It is conceivable to obtain a driving current from a capacitor also for opening a shutter. However, for opening the shutter, it is possible to correct inconstancy by the use of an auxiliary diaphragm light measuring system. Besides, such arrangement makes the length of time required for charging the capacitor longer and would not bring about such a salient improvement attainable in the shutter closing characteristic in accordance with the invention.

In each of the embodiments described in the foregoing, a moving coil type electromagnetic drive device is employed as electromagnetic drive device. However, the invention is not limited to the use of the electromagnetic drive device of the type employed in these embodiment examples. It is therefore to be understood that the present invention is applicable also to electromagnetic drive device of other types.

What is claimed is:

1. A drive system for an electromagnetically driven shutter, comprising:
   electromagnetic driving means for operating a shutter, said driving means having an exciting coil, said electromagnetic driving means being actuated when a voltage is impressed on said coil;

coupling means for connection to a power source exhibiting a voltage and arranged to impress the voltage of the power source on said exciting coil;

boosting means for boosting the voltage of said power source at said coupling means;

accumulating means coupled to the boosting means for accumulating the boosted voltage obtained by said boosting means and for impressing an accumulated voltage on said exciting coil;

power supply control selector means arranged to permit switching of said power source voltage at the coupling means between a state in which the power source voltage is impressed on said boosting means and another state in which the voltage is impressed on said exciting coil; and discerning means for discerning whether or not the brightness of an object to be photographed is above a predetermined level, said discerning means being arranged to operate said selector means to have said power source voltage impressed on said boosting means when the brightness of an object is above said predetermined level and to have said power source voltage impressed on said exciting coil when the brightness of an object is below said predetermined level.

2. A drive system according to claim 1, further including:

switching means in said electromagnetic drive means for controlling the voltage applied to said exciting coil; accumulating means for accumulating the voltage at the booster; level detecting means for detecting the accumulated voltage of said accumulating means; and inhibiting means for turning said switching means off in response to the output of said level detecting means when said level detecting means detects that the accumulated voltage of said accumulating means is below a predetermined value.

3. A drive system for an electromagnetically driven shutter comprising:

electromagnetic driving means which performs shutter opening and closing action, said driving means being provided with an exciting coil and being arranged to permit the shutter to open when a current flows to said exciting coil in one direction and to permit the shutter to close when a current flows to said exciting coil in the reverse direction;

switching means for allowing a current to flow to said exciting coil in one direction or in the reverse direction, said switching means being arranged to allow a current to flow to said coil in one direction when a release signal is applied thereto and to allow a current to flow to said coil in the reverse direction upon receipt of a timing action completion signal;

release signal producing means for producing a release signal;

timing means which commences a timing action in response to said release signal and produces a timing action completion signal upon completion of said timing action;

coupling means connected to a power source for impressing the source voltage on said exciting coil through said switching means;

boosting means for boosting the voltage of said power source;

accumulating means for accumulating the voltage boosted by said boosting means, said accumulating means being arranged to impress the accumulated voltage thereof on said exciting coil through said switching means;

power supply controlling selector means which is arranged to permit switching of the source voltage between a state in which the source voltage is impressed on said boosting means and another state in which the source voltage is impressed on said exciting coil; and discerning means for discerning whether or not the brightness of an object to be photographed is above a predetermined level, said discerning means being arranged to operate said selector means to have said power source voltage impressed on said boosting means when the brightness of an object is above said predetermined level and to have said power source voltage impressed on said exciting coil when the brightness of an object is below said predetermined level.

4. A drive system according to claim 3, wherein said switching means consists of a plurality of transistors.

5. A drive system according to claim 4, further including:

level detecting means for detecting whether the accumulated voltage of said accumulating means is below a predetermined value; and inhibiting means for turning said plurality of transistors off when said level detecting means detects that the accumulated voltage is below the predetermined value.

6. A drive system for an electromagnetically driven shutter comprising:

electromagnetic driving means for causing said shutter to operate, said driving means having an exciting coil and being arranged to operate when a voltage is impressed on said exciting coil;

connector means for connection to a power source and arranged to impress a power source voltage on said exciting coil;

boosting means arranged to boost said power source voltage;

accumulating means for accumulating the voltage boosted by said boosting means, said accumulating means being arranged to impress the accumulated voltage thereof on said exciting coil;

release signal producing means which produces a release signal;

counting means for counting exposure time, said counting means being arranged to begin a counting action in response to said release signal and to produce a counting action completion signal upon completion of the counting action; and selector means for controlling power and for switching said power source voltage between a state in which the source voltage is impressed on said boosting means and another state in which the source voltage is impressed on said exciting coil, said selector means being operated to have said power source voltage impressed on said exciting coil when said release signal is applied thereto and being operated to have the power source voltage impressed on said boosting means when said counting action completion signal is applied thereto.

7. A drive system for an electromagnetically driven shutter comprising:

electromagnetic driving means for performing shutter opening and closing actions, said driving means having an exciting coil and being arranged to permit the shutter to open when a current flows to said exciting coil in one direction and to permit the shutter to close when a current flows to said exciting coil in the reverse direction;

first switching means for having a current flow to said exciting coil in said one direction, said first switching means being arranged to permit the current of said one direction to flow to said exciting coil when a release signal is applied to said first switching means;

second switching means for having a current flow to said exciting coil in the reverse direction, said second switching means being arranged to permit the current of said reverse direction to flow to said exciting coil when a counting action completion signal is applied to said second switching means;

release signal producing means which produces said release signal;

counting means which commences a counting action in response to said release signal and produces said counting action completion signal upon completion of said counting action;

connecting means for connection to a power source and arranged to impress the power source voltage on said exciting coil through said first switching means;

boosting means for boosting the voltage of said power source; and accumulating means for accumulating the voltage boosted by said boosting means, said accumulating means being arranged to impress the accumulated voltage thereof on said exciting coil through said second switching means.

8. A drive system according to claim 7, wherein each of said first and second switching means consists of a plurality of transistors.

9. A drive system according to claim 8, further including:

level detecting means for detecting whether the accumulated voltage of said accumulating means is below a predetermined value; and inhibiting means which turns said plurality of transistors off when said level detecting means detects that the accumulated voltage is below said predetermined value.

* * * * *